United States Patent [19]
Gibbs

[11] Patent Number: 5,443,244
[45] Date of Patent: Aug. 22, 1995

[54] ROLLED METAL FENCE RAIL

[76] Inventor: Edward L. Gibbs, P.O. Box 581000, Tulsa, Okla. 74158-1000

[21] Appl. No.: 288,121

[22] Filed: Aug. 8, 1994

Related U.S. Application Data

[63] Continuation-in-part of Ser. No. 35,166, Mar. 22, 1993, abandoned.

[51] Int. Cl.6 .............................................. E04H 17/16
[52] U.S. Cl. ........................................ 256/22; 256/67; 403/263
[58] Field of Search .................. 256/22, 21, 65, 67, 256/59, 60-64, 66, 68-72, DIG. 6; 403/263, 244, 232.1, 230

[56] References Cited

U.S. PATENT DOCUMENTS

| | | | |
|---|---|---|---|
| 3,323,781 | 6/1967 | Murdock | 256/67 |
| 4,027,855 | 6/1977 | Lauzier | 256/21 |
| 4,968,005 | 11/1990 | Zen | 256/22 |
| 5,382,001 | 1/1955 | Lichti | 256/22 X |

Primary Examiner—Randolph A. Reese
Assistant Examiner—Harry C. Kim
Attorney, Agent, or Firm—William S. Dorman

[57] ABSTRACT

A rolled metal fence rail is incorporated into a picket fence which employs two or more such rails, each rail being formed by a single metal sheet which has been rolled to enclose an upside down and generally U-shaped channel or space, the space being formed by a plurality of interconnecting walls comprising a top transverse wall, an inner bottom wall spaced below the top wall, two upright outer side walls extending downwardly from the side edges of the top wall, two upright inner side walls connected to the side edges of the inner bottom wall, the lower ends of the upright outer side walls connecting with the lower ends of the upright inner side walls. The space between the top wall and the bottom wall forms a relatively narrow raceway to restrict vertical movement of the pickets when they are mounted on the retaining rods. In one embodiment, there are two parallel identical fence rails where the top wall of each rail is provided with an opening which is slightly larger than the cross section of the picket passing therethrough; the inner bottom wall has an opening whose transverse dimension is substantially equal to that of the picket passing therethrough but having a longitudinal dimension which exceeds that of the picket.

12 Claims, 5 Drawing Sheets

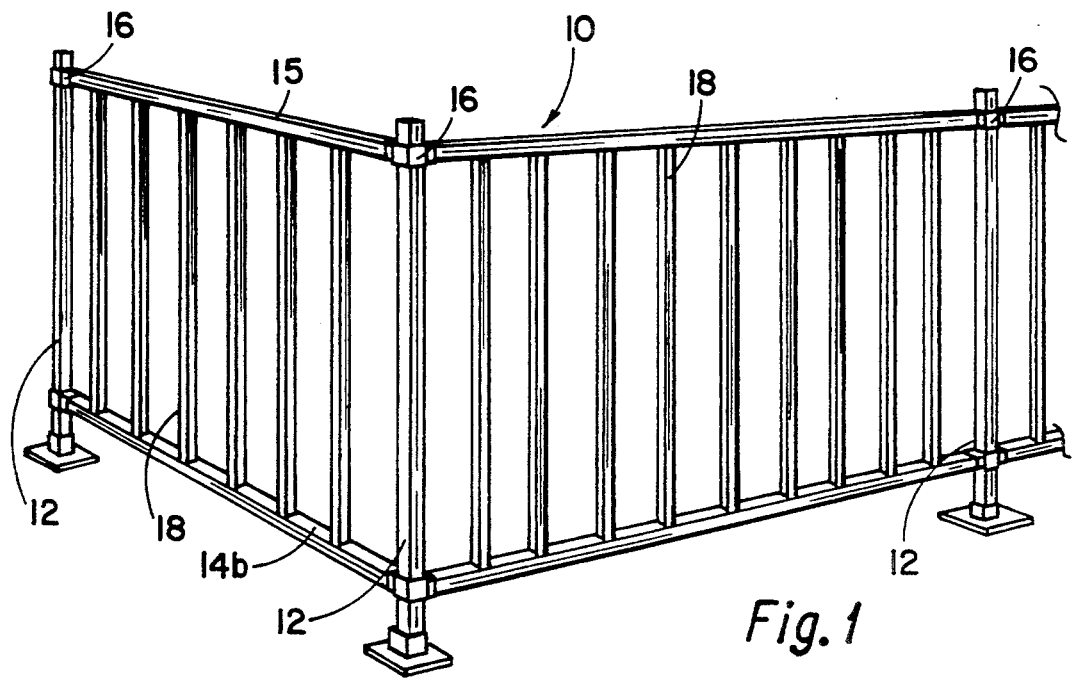
Fig. 1
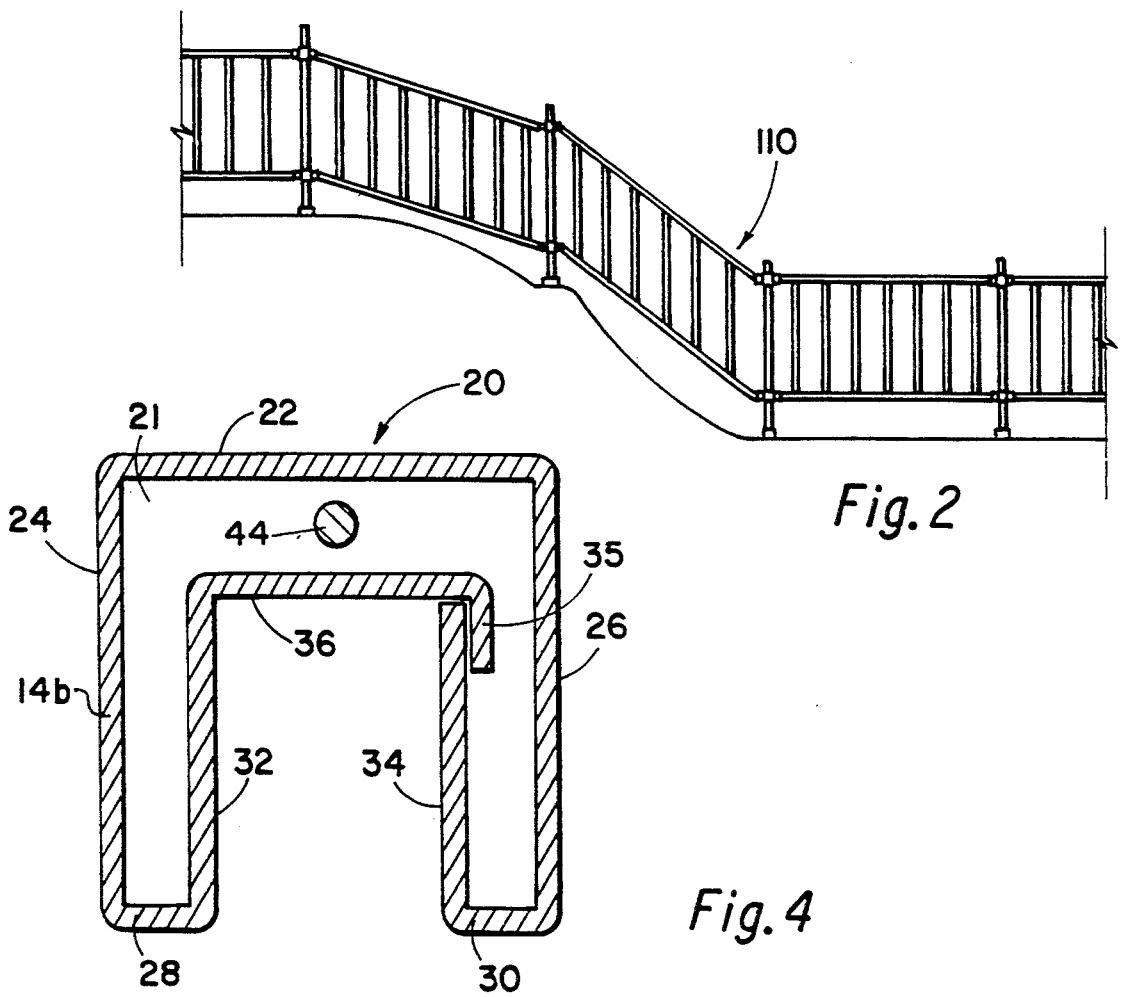
Fig. 2
Fig. 4

ROLLED METAL FENCE RAIL

CROSS REFERENCE TO RELATED APPLICATIONS

This application is a continuation-in-part of application Ser. No. 08/035,166, filed Mar. 22, 1993 and entitled "Rolled Metal Fence Rail" now abandoned.

BACKGROUND OF THE INVENTION

1. Field of the Invention

This invention relates to fencing, and more particularly to a rolled metal fence rail which can be made into a picket fence. A picket fence comprises a series of pairs of parallel, spaced-apart horizontal rails supported by posts and having a plurality of pickets therethrough.

2. The Prior Art

Searches were conducted on this invention and the following patents were uncovered in these searches:

| U.S. PAT. NO. | INVENTOR | DATE |
| --- | --- | --- |
| 1,376,150 | MILLER | 04/21 |
| 1,791,680 | MILLER | 02/31 |
| 2,590,929 | BUSH | 04/52 |
| 3,067,985 | CUSACK | 12/62 |
| 3,095,184 | BOXBERGER | 06/63 |
| 3,397,866 | HOCKETT | 08/68 |
| 3,491,984 | NYBERG | 01/70 |
| 3,522,933 | BRAUN, III | 08/70 |
| 3,707,276 | FRANCIS, et al. | 12/72 |
| 3,960,367 | ROGERS | 06/76 |
| 3,973,756 | LAUZIER | 08/76 |
| 4,140,298 | COLEMAN, JR. | 02/79 |
| 4,586,697 | TORNYA | 05/86 |
| 4,609,185 | PRATER, et al. | 09/86 |
| 4,667,935 | MOORE | 05/87 |
| 4,723,760 | O'SULLIVAN | 02/88 |
| 4,809,955 | VEILLEUX | 03/89 |
| 4,883,256 | HEBDA | 11/89 |
| 4,923,176 | HEINZ | 05/90 |
| 4,951,925 | SCHULTZ, et al. | 08/90 |
| 4,982,933 | SCHULTZ | 01/91 |
| 4,986,513 | SCHULTZ, et al. | 01/91 |
| 5,150,885 | LEONE | 09/92 |
| Great Britain Patent 2,238,331 | | 05/91 |

SUMMARY OF THE INVENTION

A general object of this invention is to provide a fence rail and picket assembly, capable of quick, easy interconnection with posts and connectors to construct a fence. Another object of this invention is to provide a fence system capable of accommodation to uneven terrain or flat terrain as encountered by the fence installers. Further objects shall appear hereinafter.

The objects of this invention can be attained by a fence system comprising a plurality of fence rails with a plurality of pickets therethrough, each said fence rail being comprised of a rolled metal sheet which forms an upside down and hollow U-shaped channel; and a plurality of posts with connectors for connecting the plurality of fence rails to the plurality of posts to form a fence. In the present invention a rolled metal fence rail is incorporated into a picket fence which employs two or more such rails, each rail being formed by a single metal sheet which has been rolled to enclose an upside down or hollow U-shaped channel or space, the space being formed by eight interconnecting walls comprising a top horizontal wall, two vertical outer side walls connected to the sides of the top wall, two horizontal outer bottom walls connected to the lower ends of the outer side walls and extending inwardly towards each other, two vertical inner side walls connected to the inner edges of the outer bottom walls and extending upwardly to a location spaced below the vertical top wall, an inner bottom wall connected to the top edge of one of the inner side walls and extending over the upper end of the other inner side wall, and a tab extending downwardly from the end of the inner bottom wall and overlapping the other inner side wall.

In one embodiment of the invention there are two parallel identical fence rails where the pickets pass completely through the top wall and the inner bottom wall of each rail, the top wall of each rail being provided with an opening which is slightly larger than the cross section of the picket passing therethrough; the inner bottom wall of each rail having an opening whose transverse dimension is substantially equal to the transverse dimension of the picket passing therethrough but having a longitudinal dimension which exceeds the longitudinal dimension of the picket passing therethrough to permit the pickets to cant with respect to the rails while remaining vertical.

In another embodiment of the invention the lower rail is the same as the two rails described above but the top rail has a solid top wall because the pickets do not pass through this top wall but terminate adjacent thereto; the inner bottom wall of the upper rail of the second embodiment is provided with openings which are substantially equal in size and shape as the pickets passing therethrough.

In both of the above two embodiments the transverse distance between the two inner side walls is equal to the transverse dimension of the pickets so that the pickets are firmly held, in a transverse direction, between the two inner side walls.

The present invention also includes several additional embodiments of the rolled metal fence rail itself. In one of these embodiments, which is the rail designed for industrial use, the sheet from which the metal fence rail is formed is considerably thicker, the lower outer bottom walls have been eliminated and replaced by curved bends, the inner vertical upright side walls have been modified to be inclined convergingly upward instead of being parallel to each other and one of the inclined inner walls, which represents one of the edges of the sheet, is tucked in to one of the lower bends between a tab and one of the outer upright side walls.

In still another embodiment of the rolled metal fence rail itself, the inner bottom wall referred to in the last embodiment is not flat but is provided with a central trough located between a pair of ridges so that the ridges project upwardly, tending to surround the rod which passes through the holes in the various pickets.

In a still further embodiment of the rolled metal fence rail itself, the upper transverse wall is curved rather than flat and connects with the outer side walls by means of curved bends.

In a still further embodiment of the rolled metal fence rail itself, the upper wall is provided with an even greater curvature than that described in the preceding embodiment so that the upper wall tends to merge through a curve of essentially the same radius into the tops of the outer upright side walls.

Finally, in a still further embodiment of the rolled metal fence rail itself, the upper transverse wall and the inner bottom wall are both angled so as to be in the shape of inverted V's which are essentially parallel to each other, the ends of the top wall connect to the upper ends of the outer side walls by means of obtuse bends; likewise, the inner bottom wall connects with the upper ends of the inner inclined side walls by obtuse bends.

In all of the embodiments referred to above, the space between the top wall and the inner bottom wall forms a relatively narrow raceway to restrict vertical movement of the pickets when they are mounted on the retaining rod.

BRIEF DESCRIPTION OF THE DRAWINGS

FIG. 1 is a fragmentary, perspective view of a section of a fence formed according to this invention.

FIG. 2 is a section of the fence showing uneven terrain accommodation.

FIG. 4 is an end view of a fence rail of this invention.

DESCRIPTION OF THE PREFERRED EMBODIMENTS

Figure 3:
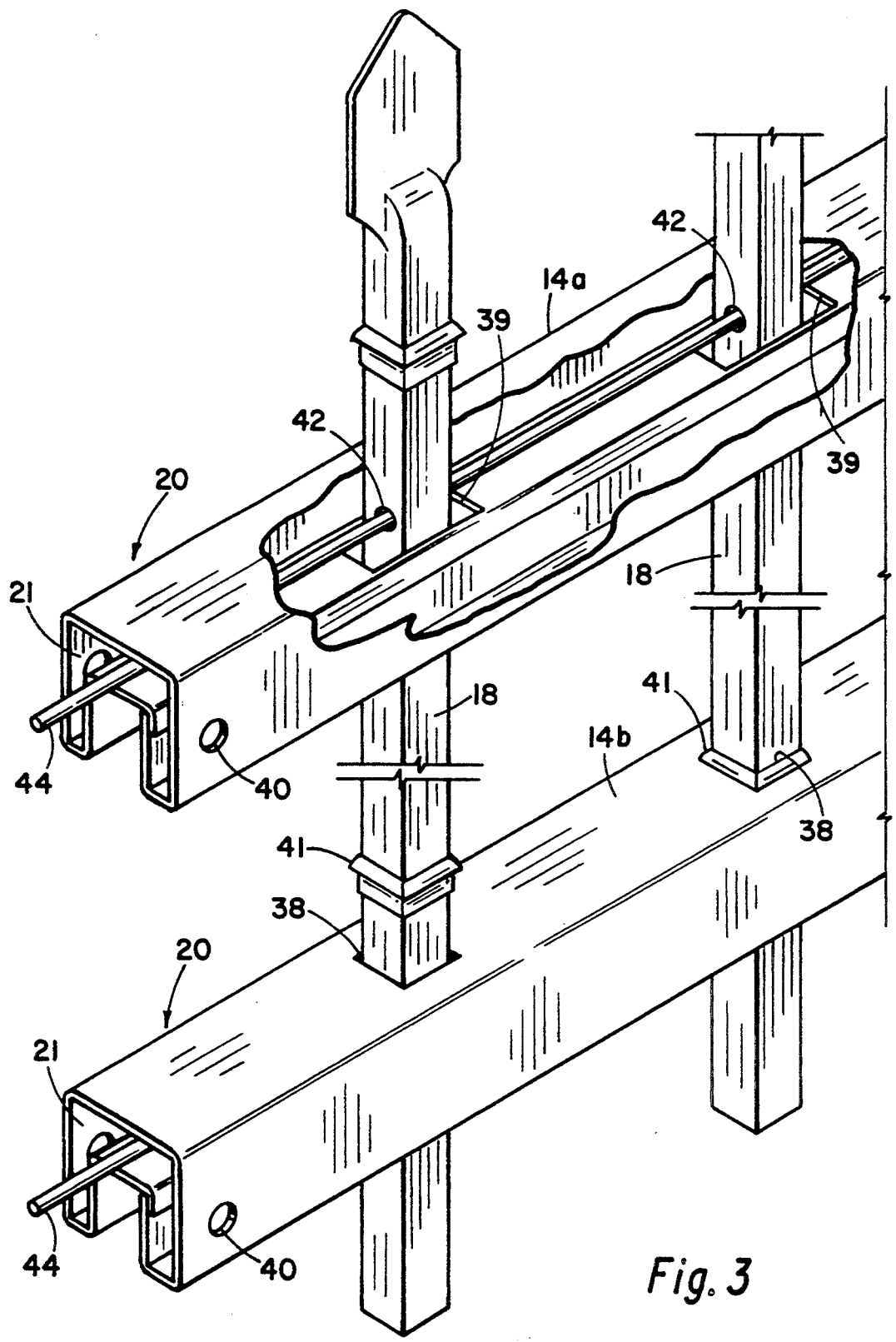
FIG. 3 is a perspective sectional view of the end of two fence rails of this invention.

Referring now to the drawings, a fence assembly of this invention, such as that depicted at 10 in FIG. 1 or 110 in Figure 2, is readily installed on flat terrain or uneven terrain, as illustrated. The fence assembly 10 is comprised of a plurality of substantially vertical posts 12, generally horizontal upper and lower rails 15 and 14b, connectors 16, and a plurality of vertical pickets 18. While a particular configuration is depicted with vertical rungs extending the entire distance between two rails 15 and 14b, it is conceivable that a particular fence could employ three or more vertically spaced rails rather than two, could have picket extensions projecting upwardly through and out of the top rail 14a, as shown in FIG. 3, or other variations for a variety of styles as desired.

Referring to FIGS. 3 and 4, a rail 14a or 14b of this invention comprises a metal sheet 20 rolled to enclose an upside down and hollow U-shaped channel 21. The upside down U-shaped channel or space 21 is surrounded by eight walls a top wall 22, two outer side walls 24 and 26, two outer bottom walls 28 and 30, two inner side walls 32 and 34, and an inner bottom wall 36 having a portion 35 which bends downwardly and overlaps the inner side wall 34.

The top wall 22 on the lower rail 14b has a plurality of apertures 38 therethrough to allow passage therethrough of the plurality of pickets 18. Similarly, the inner bottom wall 36 of the upper and lower rails 14a and 14b has a plurality of apertures 39 therethrough to allow passage therethrough of the plurality of pickets 18. In the embodiment of the invention shown in FIG. 3, the upper rail 14a and lower rail 14b are essentially identical because the pickets 18 pass above and below both rails; thus the top wall 22 of the upper rail 14a has a plurality of apertures 38 therethrough. As also shown in FIG. 3, each picket 18 is provided with a rubber or plastic grommet 41 which, as shown on the left hand picket in FIG. 3 is positioned above the rectangular opening 38; the grommet can slide into the opening 38 as shown on the right hand picket in FIG. 3.

In another embodiment, as illustrated in FIGS. 1 and 2, the top wall 22 of the upper rail 15 does not have any apertures because the plurality of pickets 18 do not extend through the top wall 22.

Returning now to FIG. 3, near each end of rail 14a or 14b, each outside wall 24 and 26 and each inner side wall 32 and 34 has an aperture 40 therethrough to allow passage therethrough of a bolt or screw (not shown) for mounting a post 12 to the end of the rail 14a or 14b. Each picket 18 has at least two apertures 42 therethrough to allow passage therethrough of a retaining rod 44, which passes between the top and inner bottom walls 22 and 36 and through the plurality of pickets 18 in both the upper and lower rails 14a and 14b.

Assuming that the picket 18 has a cross sectional width measured in a direction transverse to the rail 14a or 14b and a cross sectional length measured longitudinally with respect to the rail, then the distance between the side walls 32 and 34 is preferably equal to the cross sectional width of the picket. The opening 38 in the top wall 22 of the picket is preferably slightly larger than the cross section of the picket 18 so that when the grommet 41 is received in the opening 38, as shown on the right hand picket, the picket 18 will be firmly held in the rail 14a or 14b. However, the openings 39 on the inner bottom wall 36 have a width substantially equal to the cross sectional width of the picket, but a length which exceeds the cross sectional length of the picket. This extra length of the opening 39 allows the picket to cant and remain vertical even though the rails are inclined as at 110 in FIG. 2.

Figure 5:
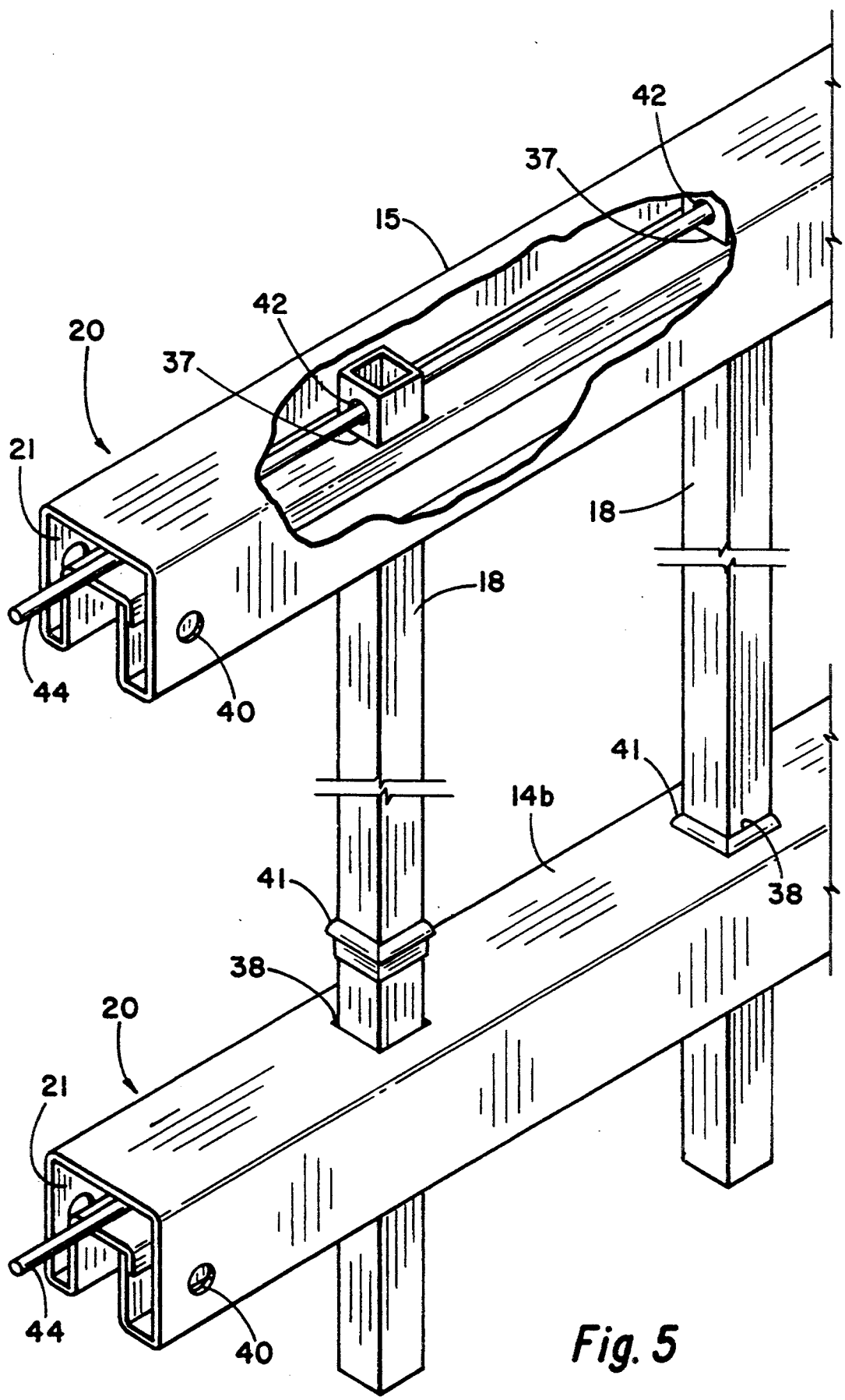
FIG. 5 is a perspective view similar to FIG. 3 but showing an arrangement where the pickets do not go above the top of the upper rail.

As indicated above, the upper rail 15 in FIGS. 1 and 2 is not the same as the lower rail 14b. As best shown in FIG. 5, the inner bottom wall 36 of the upper rail 15 would be provided with an aperture 37 which would be the same size as the cross section of the picket 18; again the upper top wall 22 would have no apertures. The upper end of the picket would be flat and would be positioned immediately adjacent the underside of the top wall 22.

Returning now to further consideration of FIG. 4, this Figure represents the cross-sectional shape of the horizontal rail whether it be rail 14b, as indicated, or 14a or 15. Briefly stated, the horizontally extending rail consists of a metal sheet 20 which has been rolled to enclose an upside down U-shaped channel 21, the sheet 20 being rolled to form eight interconnecting walls comprising a top horizontal wall 22 having first and second side edges, a first vertical outer side wall 24 connected to the top wall 22 along the first side edge thereof and terminating at a third edge spaced downwardly and parallel to the first edge, a second outer side wall 26 extending vertically downward from the second side edge of the top wall and terminating in a fourth side edge spaced below and parallel to the second side edge, the fourth side edge also being parallel to the third side edge and being in essentially the same horizontal plane, a pair of outer bottom walls 28 and 30 connected to the third and fourth side edges and extending inwardly towards each other and in the same horizontal plane and terminating in fifth and sixth side edges, said fifth and sixth side edges being parallel to each other and being in the same horizontal plane as said third and fourth side edges, a pair of inner side walls 32 and 34 extending upwardly from said fifth and sixth side edges, one of said inner side walls 34 terminating at a seventh upper edge spaced above the sixth upper edge and constituting one end of the metal sheet, the other inner side wall 32 extending upwardly from the fifth edge to an eighth edge spaced parallel with the seventh edge but slightly above the same, an inner bottom wall 36 extending horizontally from said eighth edge over the seventh edge where the inner bottom wall forms a ninth edge, a vertical tab 35 extending vertically downwardly from the ninth edge so as to overlap said one inner side wall. The lower end of the vertical tab 35 constitutes the other end of the metal sheet 20.

Figure 6:
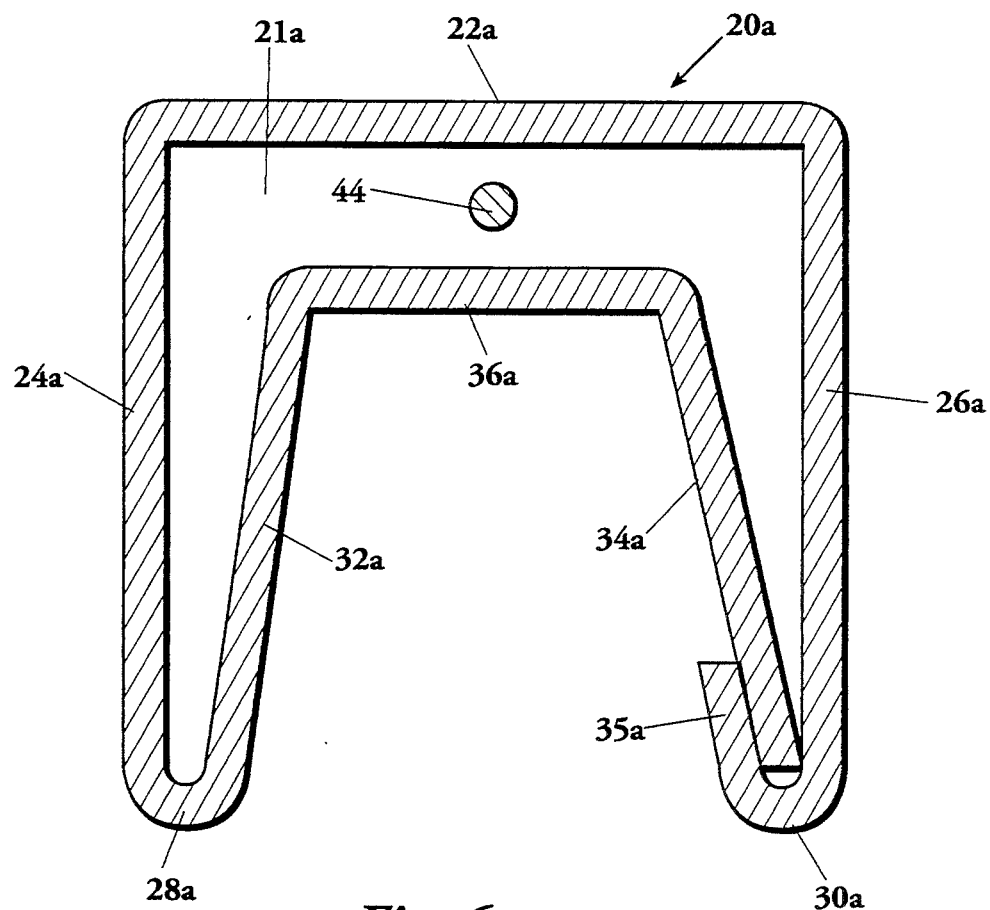
FIG. 6 is a view similar to FIG. 4 showing another embodiment of the invention which is designed principally for industrial use.

FIG. 6 represents the shape of a rolled metal fence rail which is used primarily for industrial purposes; i.e. fences around industrial buildings, etc. FIG. 6 shows a rail 20a which consists of a metal sheet which has been rolled to enclose an upside down generally U-shaped channel 21a which is similar to the U-shaped channel 21 of FIG. 4, but which is slightly modified in that the inverted arms of the U are angled rather than straight. The rolled sheet 20a has been rolled to form a plurality of interconnecting walls comprising a top horizontal wall 22a having first and second side edges, a first horizontal outer side wall 24a connected to the top wall 22a along the left hand side thereof and a second outer side wall 26a spaced from the wall 24a and parallel therewith and extending down from the right hand edge of the wall 22a.

The embodiment of FIG. 6 does not have the lower horizontal bottom walls 28 and 30 as in FIG. 4; contrariwise, the lower end of the vertical wall 24a is provided with a bend 28a at its lower end while the vertical wall 26a is provided with a bend 30a at its lower end. The embodiment of FIG. 6 is not provided with vertical walls 32 and 34 as in FIG. 4; to the contrary, the embodiment of FIG. 6 provides upright inclined walls 32a and 34a which extend convergingly upward and which connect at their upper ends to an inner bottom wall 36a. It should be noted that the upper ends of the walls 32a and 34a do not connect to the lower bottom wall 36a at right angles, but rather by obtuse angles. The lower end of the wall 32a connects to the vertical wall 24a through the bend 28a. The bend 30a connects with an inclined tab 35a. Thus, the lower end of the inclined wall 34a is tucked between the tab 35a and the vertical wall 36a in the region of the bend 30a. The structure of FIG. 6, as compared to that of FIG. 4 eliminates the two outer bottom walls 28 and 30. Also, the plate 20a is somewhat thicker than the plate 20 of FIG. 4 so as to provide greater strength for the rolled metal fence rail 20a consistent with its intended use for industrial fencing.

Comparing the structure of FIG. 4 with that of FIG. 6, there is a feature which is common to both shapes which involves a means for restricting the movement of the pickets when a single retaining rod such as the rod 44 is inserted through the horizontal drilled holes in the picket. That is, referring to FIG. 4, the space between the horizontal top wall 22 and the inner horizontal bottom wall 36 forms a relatively narrow raceway to restrict vertical movement of the pickets when they are mounted on the retaining rods; likewise, the horizontal top wall 22a and the inner horizontal bottom wall 36a of FIG. 6 are sufficiently close to form a narrow raceway to restrict vertical movement of the pickets when they are mounted on the retaining rods 44.

With the above feature in mind, FIGS. 7 to 10 represent additional embodiments of the invention where an essentially transverse upper (top) wall is located above an intermediate transverse (bottom) wall (the inner horizontal bottom wall) in such a manner that the two adjacent transverse walls form a sufficiently narrow raceway to restrict vertical movement of the pickets when a single retaining rod is inserted through the pickets.

Figure 7:
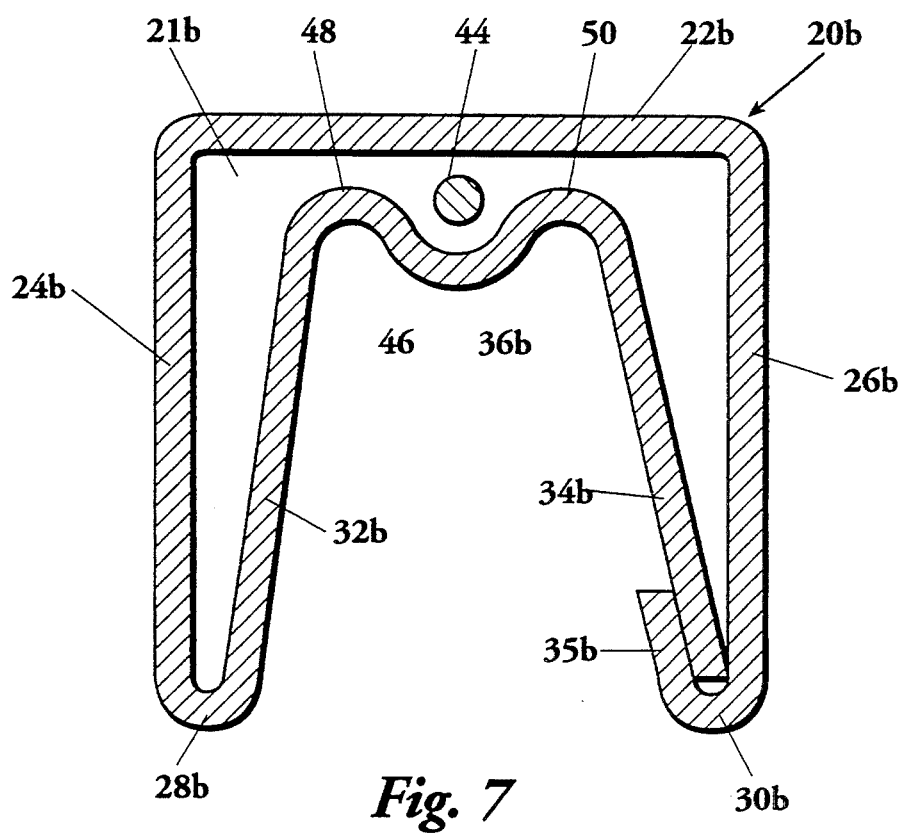
FIG. 7 is a view similar to FIG. 6 showing another embodiment of a rolled metal fence rail.

Thus, FIG. 7 shows a rolled metal fence rail similar to that shown in FIG. 6 where the metal sheet 20b has been rolled and bent to enclose an upside-down and generally U-shaped channel 21b. In other words, the sheet 20b of FIG. 7 has been rolled and bent to form a series of interconnecting walls comprising a top horizontal wall 22b having right and left side edges, a first vertical outer side wall 24b connected to the top wall 22b along the left side edge thereof, a second vertical side wall 26b extending vertically downward from the right side edge of the top wall 22b. As was the case with FIG. 6, the lower end of the side wall 24b does not connect with a short horizontal wall 28, but rather forms a bend 28; likewise, the lower edge of the vertical wall 26b terminates in a bend 30b which connects with inclined tab 35b. Inclined wall 32b extends upwardly from the bend 28b to an inner bottom wall 36b which is similar to the inner bottom wall 36a shown in FIG. 6, but which differs in a manner later to be explained. Completing the bending and rolling of the sheet 20b, an inclined wall 34b extends from the right hand edge of the transverse bottom wall 36b and terminates in a lower edge between the tab 35b and the wall 36b immediately above the bend 30b. The essential difference between FIG. 7 and FIG. 6 is that the wall 36b is curved in the center so that side portions project upwardly and around the rod 44 whereas the corresponding wall 36a in FIG. 6 is essentially flat. To be more specific, the transverse wall 36b of FIG. 7 is provided with a central trough 46 which is located between two ridges 48 and 50.

Figure 8:
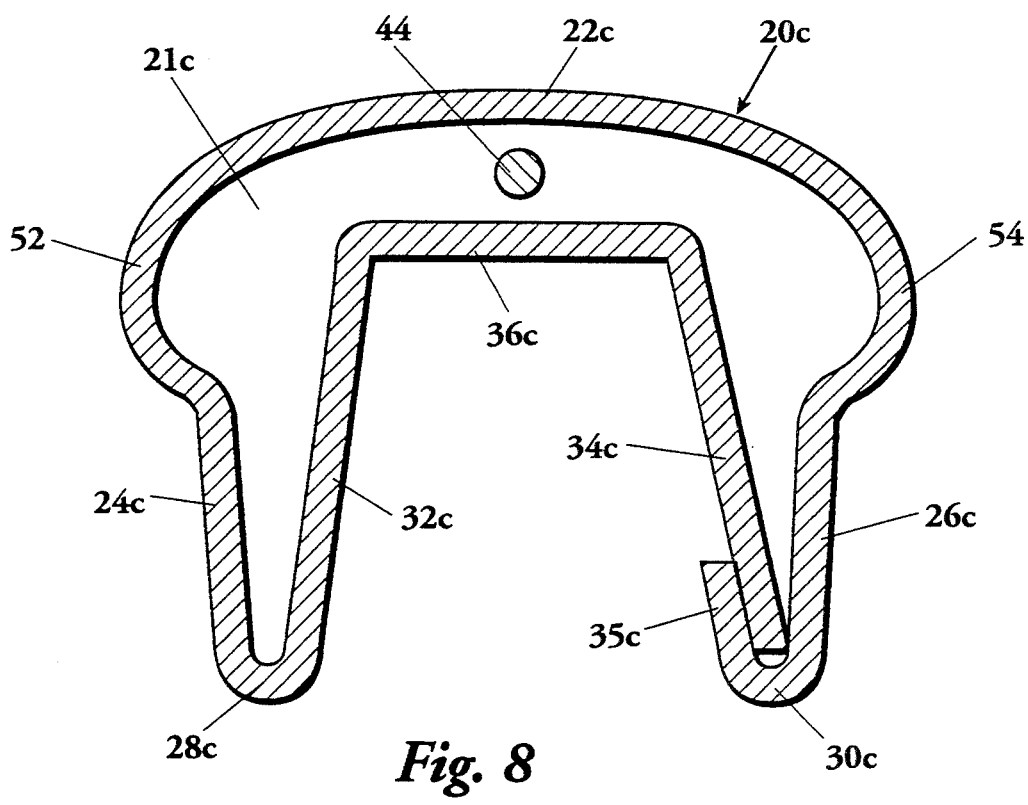
FIG. 8 is a view similar to FIGS. 4, 6 and 7 but showing a still further embodiment of a rolled metal fence rail.

FIG. 8 is similar to FIG. 6 as far as the inner walls are concerned; i.e. walls 32c, 36c and 34c correspond with walls 32a, 36a and 34a of FIG. 6; however, the upper transverse wall 22c of FIG. 8 is provided with a slight curvature. The side edges of the wall 22c connect with the inclined walls 24c and 26c by means of curved edged 52 and 54, respectively.

Figure 9:
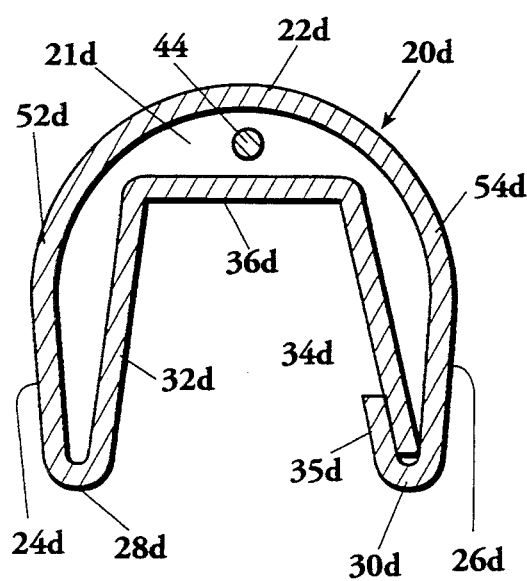
FIG. 9 is a view similar to FIGS. 4, 6 and 7 but showing a still further embodiment of a rolled metal fence rail.

FIG. 9 is similar to FIG. 8 except that the top wall 22d of FIG. 9 is even more curved than the upper wall 22c of FIG. 8. The wall 22d curves at its edges 52d and 54d so as to merge in an essentially continuous arc with the upper ends of the inclined walls 24d and 26d, respectively.

Figure 10:
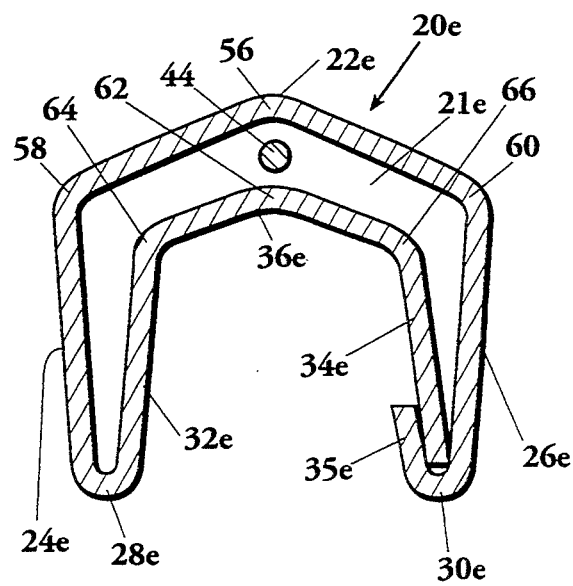
FIG. 10 is a view similar to FIGS. 4, 6 and 7 but showing a still further embodiment of a rolled metal fence rail.

In FIG. 10 the upper wall 22e is bent along the center thereof to form an apex 56. The wall 22e thus forms an inverted and wide (flat) V, the outer ends of which connect to the inclined walls 24e and 26e by means of bends 58 and 60, respectively. The inner bottom wall 36e is also bent in a manner similar to that of upper wall 22e so as to form an apex 62 located immediately below the apex 56. Side bends 64 and 66 on the inner bottom wall 36e connecting with inclined walls 32e and 34e, respectively.

Whereas, the present invention has been described in particular relation to the drawings attached hereto, other and further modifications, apart from those shown or suggested herein, may be made within the spirit and scope of this invention.

What is claimed is:

1. In a picket fence of the type having at least two parallel spaced-apart and horizontal extending rails supported by spaced vertical posts and having a plurality of spaced vertical pickets connected to the rails, the improvement wherein at least one of the horizontally extending rails consists of a metal sheet which has been rolled to enclose an upside down U-shaped channel, the sheet being rolled to form eight interconnecting walls comprising a top horizontal wall having first and second side edges, a first vertical outer side wall connected to said top wall along the first side edge thereof and terminating at a third edge spaced downwardly and parallel to the first edge, a second vertical outer side wall extending vertically downward from the second side edge of the top wall and terminating in a fourth side edge spaced below and parallel to the second side edge, the fourth side edge also being parallel to the third side edge and being in essentially the same horizontal plane, a pair of horizontal outer bottom walls connected to the third and fourth side edges respectively and extending inwardly towards each other and in the same horizontal plane and terminating in fifth and sixth side edges respectively, said fifth and sixth side edges being parallel to each other and being in the same horizontal plane as said third and fourth side edges, a pair of vertical inner side walls extending upwardly from said fifth and sixth side edges respectively, one of said inner side walls terminating at a seventh upper edge spaced above the sixth upper edge and constituting one end of the metal sheet, the other inner side wall extending upwardly from the fifth edge to an eighth edge spaced parallel with the seventh edge but slightly above the same, a horizontal inner bottom wall extending horizontally from said eighth edge over the seventh edge where the inner bottom wall forms a ninth edge, a vertical tab extending vertically downwardly from the ninth edge so as to overlap said one inner side wall, each vertical picket being defined as having a thickness measured in a direction transverse to that of said rail and a width measured in a direction longitudinally of said rail, said inner side walls being spaced apart a distance equal to the thickness of said picket whereby, when said picket extends into said rail said inner side walls bear against the sides of said picket, an opening in the top wall of said nil for said each picket, said opening being rectangular and being slightly larger than a cross sectional area of said picket, said inner bottom wall having an opening which measured in a transverse direction is equal to the thickness of said picket and when measured in a longitudinal direction is longer than the width of said picket and longer than the width of the opening in the top wall so that said picket can cant when the rail varies in position with respect to the longitudinal direction said each picket being provided with a pair of aligned apertures which are oriented in a longitudinal direction with respect to the rail, the apertures being positioned between the top wall the inner bottom wall of each said rail, and a retaining rod passing through the apertures of said each picket and extending wall.

2. In a picket fence of the type set forth in claim 1 wherein a second of said horizontally extending rails is positioned above said one horizontally extending rail wherein said second of said horizontally extending rails is provided with a top wall and an inner bottom wall, wherein the pickets pass through the inner bottom wall and the top wall of said second rail and wherein the top wall and the inner bottom wall of said second rail are provided with same sized openings as in the top wall and inner bottom wall of said one horizontally extending rail respectively.

3. In a picket fence of the type set forth in claim 1 wherein a second of said horizontally extending rails is positioned above said one horizontally extending rail wherein said second of said horizontally extending rails is provided with a top wall and an inner bottom wall, and wherein said second of said horizontally extending rails is connected to said pickets whereby said pickets do not pass through the top wall thereof but terminate adjacent an inner surface of said top wall and wherein the inner bottom wall of said second rail is provided with a rectangular opening for said each picket which is slightly larger than the cross sectional area of said picket.

4. In a picket fence of the type having at least two parallel spaced-apart and horizontally extending rails supported by spaced vertical posts and having a plurality of spaced vertical pickets connected to the rails, the improvement wherein at least one of the horizontally extending rails consists of a metal sheet which has been rolled to enclose an upside down and generally U-shaped channel, the sheet being rolled to form a plurality of interconnecting walls comprising a top transverse wall having first and second side edges; a transverse inner bottom wall disposed below the transverse top wall, the bottom wall having first and second side edges and forming with the top wall a narrow raceway; a first upright outer side wall extending downwardly from said top wall along the first side edge thereof and terminating in a lower horizontal side edge; a second upright outer side wall extending vertically downward from the second side edge of the top wall and terminating in a lower horizontal side edge; a pair of upright inner side walls extending upwardly from the lower horizontal side edges of the first and second upright outer side walls respectively to the first and second side edges of the inner bottom wall; the top wall, the bottom wall, the upright outer side walls and the upright inner side walls together forming said upside down and generally U-shaped channel; each said picket being provided with a pair of aligned apertures which are oriented in a longitudinal direction with respect to the rail, the apertures being positioned between the top wall and the inner bottom wall of said each rail and a retaining rod passing through the apertures of said each picket and extending longitudinally with respect to said each rail in the raceway between the top wall and the inner bottom wall; the top wall of said rail being provided with an opening for said each picket, said opening being rectangular and being slightly larger than a cross sectional area of said picket; said inner bottom wall having an opening for each said picket, each bottom wall opening when measured in a transverse direction being equal to the thickness of said picket and when measured in a longitudinal direction being longer than the width of said picket and longer than the width of the opening in the top wall so that each said picket can cant when the rail varies in position with respect to the longitudinal direction; the top wall and the inner bottom wall being spaced relative to each other so as to form said narrow raceway to restrict vertical movement of the pickets when the retaining rod is inserted through the apertures.

5. In a picket fence of the type set forth in claim 4 wherein a second of said horizontally extending rails is positioned above said one horizontally extending rail wherein said second of said horizontally extending rails is provided with a top wall and an inner bottom wall, wherein the pickets pass through the inner bottom wall and the top wall of said second rail and wherein the top wall and the inner bottom wall of said second rail are provided with same sized openings as in the top wall and inner bottom wall of said one horizontally extending rail respectively.

6. In a picket fence of the type set forth in claim 4 wherein a second of said horizontally extending rails is positioned above said one horizontally extending rail wherein said second of said horizontally extending rails is provided with a top wall and an inner bottom wall, and wherein said second of said horizontally extending rails is connected to said pickets whereby said pickets do not pass through the top wall thereof but terminate adjacent an inner surface of said top wall and wherein the inner bottom wall of said second rail is provided with a rectangular opening for said each picket which is slightly larger than to the cross sectional area of said picket.

7. A picket fence of the type set forth in claim 4 wherein the lower horizontal side edges of the first and second upright outer side walls connect with the upright inner side walls through a pair of horizontal outer bottom walls such that the outer side walls are essentially parallel with the upright inner side walls and wherein a vertical tab extends downwardly from one of the side edges of the bottom wall adjacent to one of the inner side walls in the space between that side wall and the adjacent outer side wall.

8. A picket fence of the type set forth in claim 4 wherein the lower horizontal side edge of one of the upright outer side walls is connected to one of the upright inner side walls by means of a bend, wherein the lower horizontal side edge of the other upright outer side wall connects with an upwardly projecting tab through means of a bend such that said other upright inner side wall extends into a space between the tab and the other upright outer side wall.

9. A picket fence of the type set forth in claim 8 wherein the transverse inner bottom wall is provided with a central groove disposed between a pair of upwardly extending ridges to form a trough for the retaining rod.

10. A picket fence of the type set forth in claim 8 wherein the top transverse wall is curved and wherein the first and second side edges connect with the upright outer side walls through curved portions.

11. A picket fence of the type set forth in claim 10 wherein the curvature of the top transverse wall and the curvature of the curved side portions are essentially of same radius.

12. A picket fence of the type set forth in claim 8 wherein the top transverse wall is shaped in the form of an inverted V and wherein the transverse inner bottom wall is also shaped in the form of an inverted V in substantially parallel relation with the top transverse wall.

* * * * *